United States Patent
Zhang et al.

(10) Patent No.: US 10,003,529 B2
(45) Date of Patent: Jun. 19, 2018

(54) METHOD AND SYSTEM FOR MEMORY ALLOCATION IN A SOFTWARE-DEFINED NETWORKING (SDN) SYSTEM

(71) Applicant: Telefonaktiebolaget L M Ericsson (publ), Stockholm (SE)

(72) Inventors: Jiangtao Zhang, San Jose, CA (US); Mark Hlady, San Jose, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 283 days.

(21) Appl. No.: 14/818,223

(22) Filed: Aug. 4, 2015

(65) Prior Publication Data
US 2017/0041220 A1    Feb. 9, 2017

(51) Int. Cl.
H04L 12/725    (2013.01)
H04L 12/751    (2013.01)
H04L 12/721    (2013.01)
H04L 12/741    (2013.01)
H04L 12/715    (2013.01)

(52) U.S. Cl.
CPC .......... *H04L 45/302* (2013.01); *H04L 45/38* (2013.01); *H04L 45/54* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 8,280,424 B2* | 10/2012 | Sarkkinen | H04L 69/22 455/445 |
| 2008/0155206 A1 | 6/2008 | Gurumurthy | |
| 2012/0173841 A1* | 7/2012 | Meier | G06F 12/1009 711/202 |
| 2013/0246552 A1* | 9/2013 | Underwood | G06F 15/167 709/212 |

(Continued)

FOREIGN PATENT DOCUMENTS

CA    2 895 688 A1    6/2014

OTHER PUBLICATIONS

"OpenFlow Switch Specification," Open Networking Foundation, Version 1.4.0 (Wire Protocol 0x05), Oct. 14, 2013, pp. 91-92.*

(Continued)

*Primary Examiner* — Charles C Jiang
*Assistant Examiner* — George Atkins, Jr.
(74) *Attorney, Agent, or Firm* — Nicholson De Vos Webster & Elliott LLP

(57) ABSTRACT

Methods for memory allocation in a software-defined networking (SDN) system are disclosed. In one embodiment, the method includes receiving a first message in a network device from a SDN controller, where the first message includes a request to generate an entity in the network device to route traffic, and where the entity is one of a flow table entry, a group table entry, and a flow table. The method further includes identifying an indication in the first message that indicates at least one memory usage characteristic of the entity, where the at least one memory usage characteristic includes at least one of a target access speed and a target storage scalability of the entity; and generating, at least partially based on the indication, the entity using one memory type of a plurality of memory types of the network device.

18 Claims, 7 Drawing Sheets

(56) References Cited

U.S. PATENT DOCUMENTS

| | | |
|---|---|---|
| 2014/0047251 A1 | 2/2014 | Kottilingal et al. |
| 2014/0269690 A1 | 9/2014 | Tu |
| 2016/0216913 A1* | 7/2016 | Bosshart .......... H04L 45/74 |
| 2017/0026274 A1* | 1/2017 | Wang .......... H04L 12/6418 |
| 2017/0034063 A1* | 2/2017 | Mozolewski ..... H04L 45/021 |

OTHER PUBLICATIONS

"OpenFlow Switch Specification", Open Networking Foundation, Version 1.4.0 (Wire Protocol 0x05), Oct. 14, 2013, pp. 1-205.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

| Flow Table Entry 101 | Match Fields 102 | Priority 103 | Counters 104 | Instructions 106 | Timeouts 107 | Cookie 108 |

| Group Table Entry 111 | Group Identifier 112 | Group Type 114 | Counters 116 | Action Buckets 118 |

| Meter Table Entry 121 | Meter Identifier 122 | Meter Bands 124 | Counters 126 |

FIG. 1C

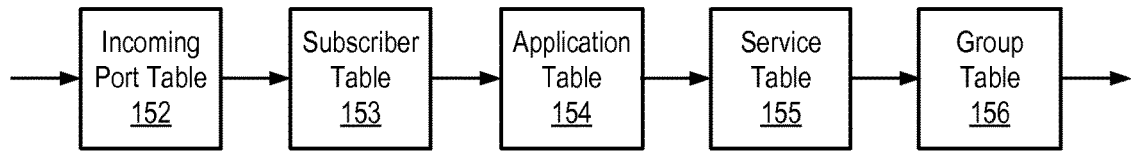

| Incoming Port Table 152 | → | Subscriber Table 153 | → | Application Table 154 | → | Service Table 155 | → | Group Table 156 | → |

Matching
- Incoming port
- VLAN ID

Matching
- Ethertype
- Source IP

Matching
- Destination IP
- Protocol type
- Destination Port

Matching
- Subscriber ID
- Application ID

Matching
- Group ID

FIG. 1D

METHOD AND SYSTEM FOR MEMORY ALLOCATION IN A SOFTWARE-DEFINED NETWORKING (SDN) SYSTEM

FIELD OF INVENTION

The embodiments of the invention are related to the field of networking. More specifically, the embodiments of the invention relate to a method and system for memory allocation in a software-defined networking (SDN) system.

BACKGROUND

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

A SDN system includes one or more SDN controllers and a set of network elements managed by the SDN controllers. Each network element includes a variety of memory types, yet currently there is no efficient way for a SDN controller and a network element to communicate and determine how to allocate memory for operations in the network element.

SUMMARY

Methods for memory allocation in a software-defined networking (SDN) system are disclosed. In one embodiment, the method is implemented in a network device coupled to a SDN system, where the SDN system includes a SDN controller managing the network device. The method includes receiving a first message from the SDN controller, where the first message includes a request to generate an entity in the network device to route traffic, and where the entity is one of a flow table entry, a group table entry, and a flow table. The method further includes identifying an indication in the first message that indicates at least one memory usage characteristic of the entity, where the at least one memory usage characteristic includes at least one of a target access speed and a target storage scalability of the entity; and generating, at least partially based on the indication, the entity using one memory type of a plurality of memory types of the network device.

Network devices for memory allocation are disclosed. In one embodiment, the network device is coupled to a software-defined networking (SDN) system, where the SDN system includes a SDN controller managing the network device. The network device comprises a processor and a non-transitory machine-readable storage medium that includes a plurality of memory types, the non-transitory machine-readable storage medium coupled to the processor, the non-transitory machine-readable storage medium containing operations executable by the processor. The network device is operative to receive a first message from the SDN controller, where the first message includes a request to generate an entity in the network device to route traffic, and where the entity is one of a flow table entry, a group table entry, and a flow table; the network device is operative to identify an indication in the first message that indicates at least one memory usage characteristic of the entity, where the at least one memory usage characteristic includes at least one of a target access speed and a target storage scalability of the entity; and the network device is operative to generate, at least partially based on the indication, the entity using one memory type of the plurality of memory types of the network device.

Non-transitory machine-readable storage media for memory allocation are disclosed. In one embodiment, a non-transitory machine-readable storage medium has instructions stored therein, which when executed by a processor, cause the processor to perform operations in a network device coupled to a software-defined networking (SDN) system, where the SDN system includes a SDN controller managing the network device. The operations include receiving a first message from the SDN controller, where the first message includes a request to generate an entity in the network device to route traffic, where the entity is one of a flow table entry, a group table entry, and a flow table. The operations further include identifying an indication in the first message that indicates at least one memory usage characteristic of the entity, where the at least one memory usage characteristic includes at least one of a target access speed and a target storage scalability of the entity; and generating, at least partially based on the indication, the entity using one memory type of a plurality of memory types of the network device.

Embodiments of the disclosed techniques aim at implementing an efficient way at a network device in a SDN system to allocate memory based on information provided by the SDN controller.

BRIEF DESCRIPTION OF THE DRAWINGS

The invention may best be understood by referring to the following description and accompanying drawings that are used to illustrate embodiments of the invention. In the drawings:

FIG. 1C illustrates an exemplary flow table entry, an exemplary group table entry, and an exemplary meter table entry according to one embodiment of the invention.

FIG. 1D illustrates an exemplary packet forwarding process of a traffic flow.

DETAILED DESCRIPTION

Figure 1A:
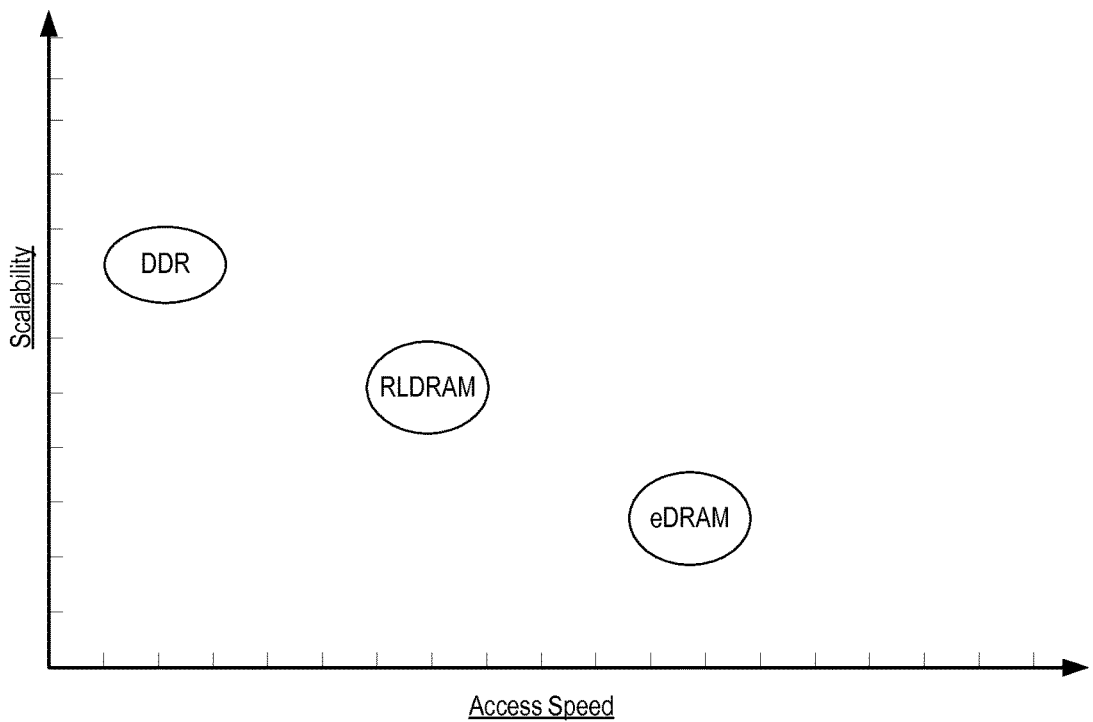
FIG. 1A illustrates characteristics of a set of exemplary dynamic random-access memories (DRAMs) that may be used in a network device.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Resources in a SDN Network Device

In a software-defined networking (SDN) system, packets are forwarded through traffic flows (or simply referred to as flows), and a network element forwards the flows based on its forwarding tables, which are managed by one or more network controllers (also referred to as SDN controller, where the terms are used interchangeably in the specification). A flow may be defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports). A network element may be implemented in one or more network devices.

A network device, as explained in more details herein below in relation to FIG. 7A, may be implemented as a special purpose network device that uses custom application-specific integrated-circuits (ASICs) and/or a proprietary operating system (OS), a general purpose network device that uses common off-the-shelf (COTS) processors and a standard OS, or a hybrid network device that uses both. In different network devices, the memory resources to be used may be different.

A special purpose network device typically is tailored specifically for implementing one or more SDN network elements such as OpenFlow switches. Some special purpose network devices include memory with different characteristics. For example, a special purpose network device may include a variety of dynamic random-access memory (DRAM) versions with different interfaces for communicating with the DRAMs such as double data rate synchronous DRAM (DDR SDRAM), reduced-latency DRAM (RLDRAM), and/or embedded DRAM (eDRAM) integrated on the same die as a processor.

FIG. 1A illustrates characteristics of a set of exemplary DRAMs that may be used in a network device. The characteristics of interest when the DRAMs are used in a network device include access speed and scalability. Access speed of a DRAM indicates the speed to locate specific data in the DRAM for an associated processor to process; thus, the shorter the access time of the DRAM, the quicker is its access speed. Scalability of a DRAM indicates how efficiently the DRAM can be scaled to a higher capacity. For example, if doubling a DRAM capacity quadruples the cost, the DRAM may be deemed to not scale well. Typically there is a tradeoff between access speed and scalability, i.e., one DRAM version may have a higher access speed but be less scalable while another DRAM may have opposite characteristics. The relative access speed and scalability of some DRAM versions in one implementation of a network device is illustrated in FIG. 1A.

As illustrated, typically DDR SDRAM (e.g., DDR3) is highly scalable in comparison to RLDRAM and eDRAM, but its access speed is slower than both RLDRAM and eDRAM. In contrast, as eDRAM is on the same die as the processor, its access speed is superior to the other two, but given the size limitation of the die, it is very expensive to scale eDRAM to a higher capacity. Thus, eDRAM is not as scalable as either DDR or RLDRAM. RLDRAM is in the middle of DDR and eDRAM in both scalability and access speed.

While only access speed and scalability of various DRAM versions are illustrated, it is to be understood that the various memory versions have other characteristics that are worth considering such as these memory versions' access bandwidth and power consumption.

It is to be noted that other DRAM versions may also be implemented as memory of a SDN network device in addition to or in place of the illustrated DRAM versions. For example, a network device may include fast cycle RAM (FCRAM), enhanced SDRAM (ESDRAM), RDRAM (Rambus DRAM), and/or synchronous graphic RAM (SGRAM). These DRAM versions have their own access speed and scalability characteristics. Besides DRAM, other memory such as phase-change memory, static random-access memory (SRAM), content-addressable memory, thyristor RAM (T-RAM), and zero-capacitor (Z-RAM) may also be used in implementing a SDN network device. Each of the memory versions has particular characteristics such as access speed, scalability, access bandwidth, and power consumption, and these particular characteristics may be obtained through benchmark testing.

A general purpose network device uses common off-the-shelf (COTS) processors and a standard operating system (OS). In a general purpose network device, volatile memory is often accessed using a technique called paging. When using paging, the virtual address space (i.e., the address space generated by either the execution unit of a processor or by the execution unit in conjunction with a segmentation unit of a processor) is divided into fixed-sized blocks called pages, each of which can be mapped onto any of the physical addresses (i.e., the addresses that correspond to hardware memory locations) available on the system. In a typical general purpose network device, a memory management unit determines and maintains, according to paging algorithm(s), the current mappings for the virtual to physical addresses using one or more page table.

Upon receiving a virtual address from the execution unit of a processor, also sometimes referred to as a linear address (LA), typical memory management units initially translate the LA into its corresponding physical address using the page table(s). Since the page table(s) are often stored in a main memory, accessing the page tables is time consuming. To speed up the paging translations, certain general purpose network devices store the most recently used translations in a translation lookaside buffer or TLB (a faster memory that is often located on the processor). Upon generating a LA requiring translation, the memory management unit first searches for the translation in the TLB before accessing the page table(s). If the translation is stored in the TLB, a TLB "hit" is said to have occurred and the TLB provides the translation. However, if the translation is not stored in the TLB, a TLB "miss" is said to have occurred and a page table walker is invoked to access the page tables and provide the translation. TLB caches typically have arrays to access different page sizes. For example, the page sizes may include 4 kilobytes (kB), 2 and/or 4 (2/4) Megabytes (MB), and 1 gigabyte (GB). Correspondingly, the main memory has different regions for different page sizes, so that the data may be written into and/or read from the different page sizes such as 4 kB, 2/4 MB, and 1 GB page regions.

Figure 1B:
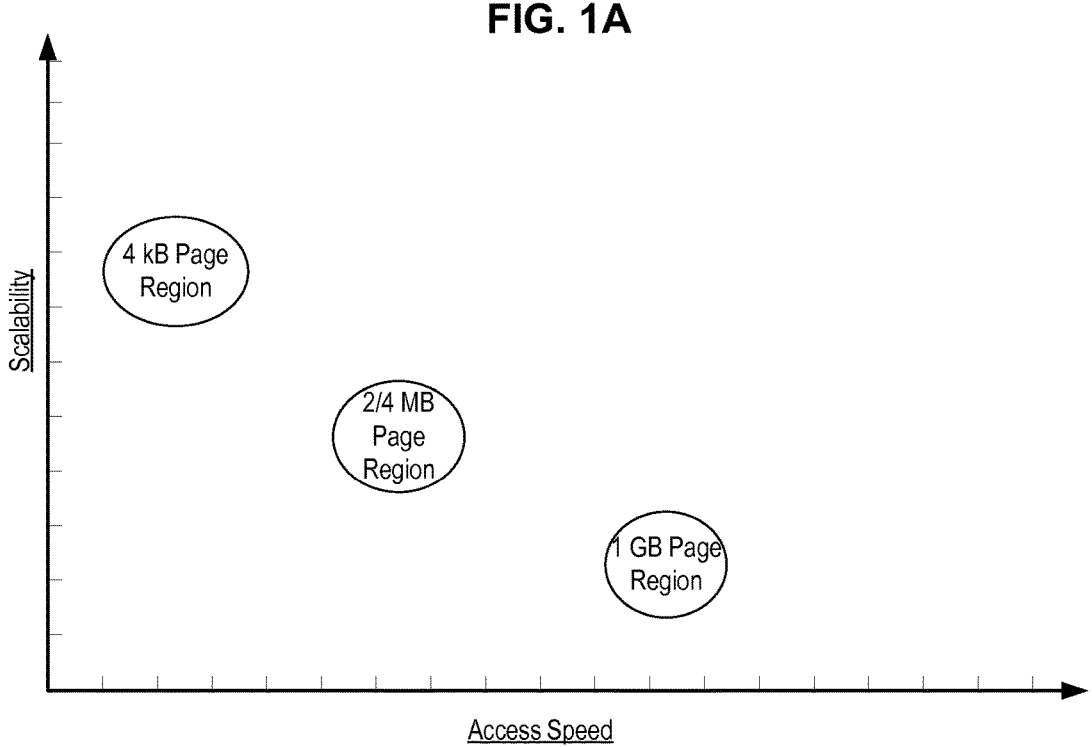
FIG. 1B illustrates characteristics of a set of page regions that may be used in a network device.

FIG. 1B illustrates characteristics of a set of page regions that may be used in a network device. Similar to the special purpose network device, the characteristics of interest when the different page regions are used in a network device include access speed and scalability. As illustrated, the 4 kB page region is highly scalable in comparison to the 2/4 MB page region and 1 GB page region, but its access speed is slower than both the 2/4 MB page region and 1 GB page region. Because with the smaller page size, fewer entries can be stored in the TLB, thus more TLB misses will occur for the 4 kB page region than for the 2/4 MB and 1 GB page regions; thus, the average access speed will be lower for the 4 kB page region. In contrast, the 1 GB page region has the highest access speed of the three, but it is the least scalable of the three. The 2/4 MB page region is in the middle of the 4 kB and 1 GB page regions in both scalability and access speed.

A general purpose network device may have regions of other page sizes, and similar to the special purpose network device, each page region may have other characteristics that are worth considering such as the page region's access bandwidth and power consumption.

A hybrid network device may use both custom ASICs/proprietary OS and COTS processors/standard OS in a single network device or a single card within a network device. The hybrid network device thus may include different memory versions and/or memory page regions. In some embodiments, a special purpose network device or a general purpose network device may also include different memory versions and/or memory page regions. For example, a special purpose network device may have different memory versions, and each/some of the memory versions have different page regions (e.g., a special purpose network device has a DDR3 that has page regions of 4 kB and 2 MB).

In this specification, the term "memory type" and "type of memory" refer to memory version and/or page region of memory, and it is an umbrella term covering different memory categories, regardless of how they are communicated (versions of memory such as various DRAMs) and how they are mapped (page regions).

Since different operations in a network device may have different requirements to the memory types involved, thus it is desirable to have a network device consider the characteristics of the various memory types to determine what memory type to use for different operations in the network device.

SDN Forwarding Operations

In a network element of a SDN system, packets of traffic flows are forwarded based on forwarding tables. Forwarding tables are generated in the network element, often based on instructions from the SDN controller and the available resources in the network element. Forwarding tables store routing information to direct routing of incoming packets by a network element. Forwarding tables may have a variety of types. For example, the OpenFlow standard defines flow table, group table, meter table, etc. Each table includes one or more table entries. FIG. 1C illustrates an exemplary flow table entry 101, an exemplary group table entry 111, and an exemplary meter table entry 121 according to one embodiment of the invention.

Flow Table Entry 101 Includes:
  Match fields 102: To match against packets. These comprise the ingress port and packet headers, and optionally metadata specified by a previous table.
  Priority 103: Matching precedence of a flow table entry.
  Counters 104: Updated when packets are matched.
  Instructions 106: To modify the action set or packet pipeline processing.
  Timeouts 107: Maximum amount of time or idle time before flow is expired by the network element.
  Cookie 108: Opaque data value chosen by the network controller. May be used by the controller to filter flow statistics, flow modification, and flow deletion.

A flow table entry may be identified by its match fields and priority; the match fields and priority taken together identify a unique flow table entry in the flow table. A flow table entry generally allows the packets of a matching flow to be dropped or forwarded to one port. That is, a flow table entry generally allows a network element to dispose a packet to one port.

In contrast, a group table entry may allow a network element to dispose a packet to one port, one of multiple ports, or multiple ports. The group table entry 111 includes:
  Group identifier 112: A numeric number (e.g., a 32 bit unsigned integer) uniquely identifying a group.
  Group type 114: To determine group semantics.
  Counters 116: Updated when packets are processed by a group.
  Action buckets 118: An ordered list of action buckets, where each action bucket includes a set of actions to execute and associated parameters.

A group table entry may be identified by a group identifier. A group table entry generally allows the packets of a matching flow to be forwarded to: a random port on a group of ports (for load-balancing), a first live port on a group of ports (for failover), and all ports on a group of ports (for multicasting). Thus, a group table entry allows a network element to dispose a packet to multiple ports.

A meter table entry defines per-flow meters that allow a network element to implement various quality of service (QoS) operations. A meter table entry 121 includes:
  Meter identifier 122: A numeric number (e.g., a 32 bit unsigned integer) uniquely identifying a meter.
  Meter bands 124: An unordered list of meter bands, where each meter band specifies a rate of the band and a way to process a packet.
  Counters 126: Updated when packets are processed by a meter.

A traffic flow may traverse multiple forwarding tables when the packet is processed by a network element. The multiple forwarding tables form a service chain of the traffic flow. FIG. 1D illustrates an exemplary packet forwarding process of a traffic flow. A packet of the traffic flow first enters an incoming port table 152 that matches the incoming port and virtual local area network (VLAN) identifier of the packet. After performing operations based on the corresponding instructions of the matching table entry, the network element forwards the packet to a subscriber table 153 that matches the protocol type of the encapsulated Ethernet frame within the packet using the Ethertype field and the source IP address of the packet. Similarly, the network element forwards the packet to: an application table 154 that matches the protocol type, the destination IP address, and the destination port of the packet; a service table 155 that matches a subscriber identifier and an application identifier; and then a group table 156 that matches a group identifier. At each table, operations are performed on the packet based on the corresponding instructions of the matching table entry. After finishing the packet forwarding process, the network element may forward the packet outside of the network element to the next network element and/or report to the network controller.

Different traffic flows may have different packet forwarding processes, and some forwarding tables are used by more traffic flows than others. It will be advantageous to generate these more popular forwarding tables in a type of memory that has a higher access speed. Other forwarding tables include more table entries, and do not necessarily need fast access speed, and it will be advantageous to generate these more populous forwarding tables in a type of memory that is highly scalable.

Adaptive Generation of Forwarding Tables and Table Entries

Figure 2:
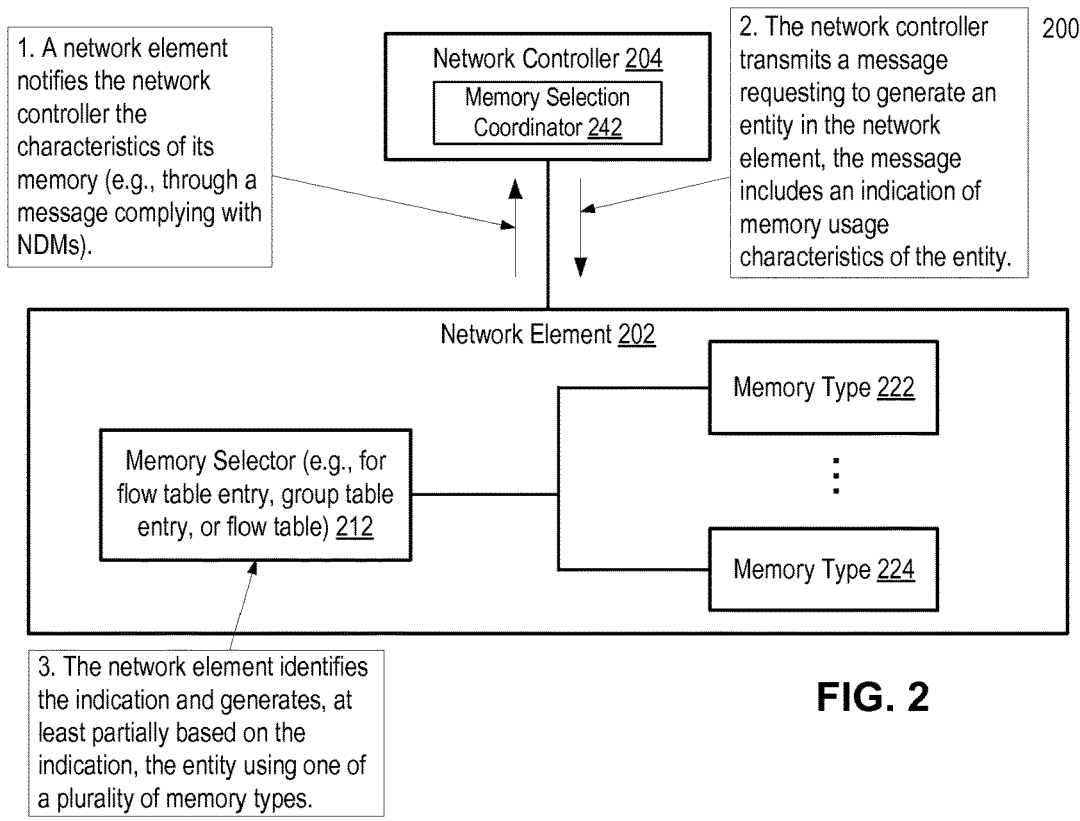
FIG. 2 illustrates operations of adaptive generation of forwarding table and table entries according to a first embodiment of the invention.

FIG. 2 illustrates operations of adaptive generation of forwarding table and table entries according to a first embodiment of the invention. SDN system 200 includes network controller 204, which manages a number of network elements such as a network element 202. The detailed operations of a network controller and network elements are discussed herein below in relation to FIGS. 7A-F. The network element 202 may be implemented as OpenFlow switches in compliance with the OpenFlow standards. Task boxes 1 to 3 illustrate the order in which operations are performed according to one embodiment of the invention.

At task box 1, the network element 202 notifies the network controller 204 the characteristics of the network element's memory. The notification may be performed through a message transmitted from the network element 202 to the network controller 204. In one embodiment, the message is in compliance with a standard for OpenFlow Table Type Patterns (TTPs) (e.g., the Open Network Foundation OpenFlow Table Type Patterns 1.0, dated Aug. 15, 2014).

The transmitted message to the network controller 204 typically announces the network element's support for a specific set of forwarding tables and actions. A table type pattern (TTP) is an abstract switch model that describes specific OpenFlow switch's forwarding behaviors, so that the receiving network controller (referred to as an OpenFlow controller when the network controller is in compliance with the OpenFlow standards) knows how to interact with the OpenFlow switch. It is to be noted that the TTP switch model is a category of negotiable datapath models (NDMs) that are being developed in the Open Network Foundation for the OpenFlow switch and OpenFlow controller, and other models may serve NDMs and other models may be developed to perform the same or similar functions for an OpenFlow switch to notify an OpenFlow controller of the OpenFlow switch's capability (e.g., supporting a specific set of forwarding tables and actions).

The transmitted message may indicate the resource capabilities including the types of memory supported and availability/size of the supported types of memory of the network element (together referred to as the available memory types). A message of NDMs from the network element may include parameters to indicate the available memory types of the network element. For example, a TTP may implement a set of parameters to indicate support of memory types. One parameter may indicate the available memory types for flow table generation (e.g., using a new "TablePerformance" parameter); another parameter may indicate the available memory types for flow table entry (e.g., using a new "TableFlow performance" parameter); and another parameter may indicate the available memory types for group table entry (e.g., using a new "GroupPerformance" parameter). Additionally/alternatively, other parameters may be included in a TTP to indicate the available memory types for a group table, a meter table, or a meter table entry.

Through NDMs, the network controller may receive notice of current available memory types for generating different entities to forward packets in a network element, so the network controller can make a more accurate determination of which available memory types to utilize to generate the different entities in the network element.

At task box 2, the network controller 204 transmits a message to the network element 202, requesting to generate an entity in the network element. The message includes an indication that indicates a memory usage characteristic of the entity, where the indication may be inserted by a memory selection coordinator 242, where the memory usage characteristic may be based on the notification received in task box 1, which may be used to determine what indication to insert in the message. For example, if the most preferable memory type has been fully utilized based on the notification received in task box 1, the network controller 204 may transmit the message with an indication for a memory usage characteristic for the second best memory type. The entity to be generated may be a flow table, a flow table entry, a group table, a group table entry, a meter table, or a meter table entry. A network element typically includes multiple flow tables and meter tables, but only one group table, so more frequently the message is for generating a flow table or a meter table. The memory usage characteristic may include a value set to indicate at least one of a desired or target access speed, a desired or target storage scalability, a desired or target access bandwidth, and a desired or target power consumption level.

At task box 3, the network element 202 identifies the indication in the transmitted message and generates, at least partially based on the indication, the entity using one of a plurality of memory types. The identification is performed by a memory selector 212, and the memory types to be selected to generate the entity may include memory types 222 and 224.

The indication in the message transmitted from the network controller 204 to the network element 202 may include a field that is currently defined in a SDN standard. For example, in the OpenFlow standard, a network controller transmits an OFPMP_TABLE_FEATURES request to a network element to request the network element to modify a flow table feature. OFPMP_TABLE_FEATURES includes a structure ofp_table_features, which includes a variable referred to as max_entries. The variable max_entries indicates how many entries a flow table is supposed to support, and thus it indicates how big the flow table can be. The size indication indicates a target storage scalability, which may be used on the network element 202 to select which memory type to use. For example, if the max_entries variable indicates the table is relatively big in size, the network element may use the DDR to generate the flow table, if DDR, RLDRAM, and eDRAM are the memory types to be selected.

The indication in the message transmitted from the network controller 204 to the network element 202 may include a new field that can be added to the existing SDN standard. For example, the structure ofp_table_features discussed in the preceding paragraph may add a variable for a target performance priority (e.g., OFPTFPT_PERF_PRIO, short for OFPT table feature properties performance priority) of the flow table to be generated. The target performance priority of the flow table may be a numerical number in a range (0-4, 1-10, or another range). If the target performance priority is high (e.g., OFPTFPT_PERF_PRIO=0), the network element 202 may use eDRAM to generate the flow table, if DDR, RLDRAM, and eDRAM are the memory types to be selected. If the network element 202 is implemented by a general purpose network device, a page region of 1 GB may be selected to generate the flow table if the page regions of 4 kB, 2/4 MB, and 1 GB are available.

The indication in the message may be also used to generate a flow table entry within an existing flow table. For example, in the OpenFlow standard, a network controller transmits an OFPT_FLOW_MOD message to a network element to request the network element to generate a flow table entry. The OFPT_FLOW_MOD message may add a variable for a target performance priority (e.g., PERF_PRIO) of the flow table entry to be generated. The target performance priority of the flow table entry may be a numerical number in a range that is the same as or different from that of the flow table. The network element 202 may generate the flow table entry upon receiving the OFPT_FLOW_MOD message accordingly, similar to the description in the preceding paragraph. It is to be noted that the performance priority is separated from the priority field of a flow table entry, which is to indicate matching priority. A performance priority of a flow table entry is an additional field added to indicate how/where the flow table entry is generated.

Additionally, the indication in the message may be also used to generate a group table entry within an existing group table. The network controller may transmit an OFPT_GROUP_MOD message to a network element to request the network element to generate a group table entry. The OFPT_GROUP_MOD message may use a variable for a target performance priority (e.g., PERF_PRIO) of the group table entry to be generated. The network element 202 may generate the group table entry accordingly. The adding of a variable for a target performance priority of a group table, a meter table, or a meter table entry to be generated operates similarly and will not be repeated.

It is to be noted that the flow table entries, group table entries, and meter table entries are described above as to be generated distributively. Some network devices implementing the network elements have an architecture that supports the distributed table entries, thus table entries of a same table may be generated using different memory types. In this kind of architecture, the performance priority indication facilitates these network elements achieve better performance. For an architecture that does not support this kind of distribution, the performance priory indication for a table entry in the message is ignored.

Also, it is to be noted that sending the message from the network element 202 to the network controller 204 to notify the characteristics of the network element's memory (task box 1) is not mandatory in all embodiments. The network controller 204 may know the available memory types from interaction with the network element 202 for other operations. Also, when the network controller 204 and the network element 202 are made from the same manufacturer, the network controller 204 may know the memory types of the network element 202 by default. Additionally, even if the network controller 204 does not know the current available memory type of the network element 202, the network controller 204 can still transmit the message with the indication of the memory usage characteristics of the entity to be generated. In that case, the indication from the network controller 204 is not binding. Rather, it is used in combination with other information of the network element 202 (e.g., the current availability of various memory types) to determine which memory type to use to generate the entity.

Embodiments of Adaptive Generation

Figure 3:
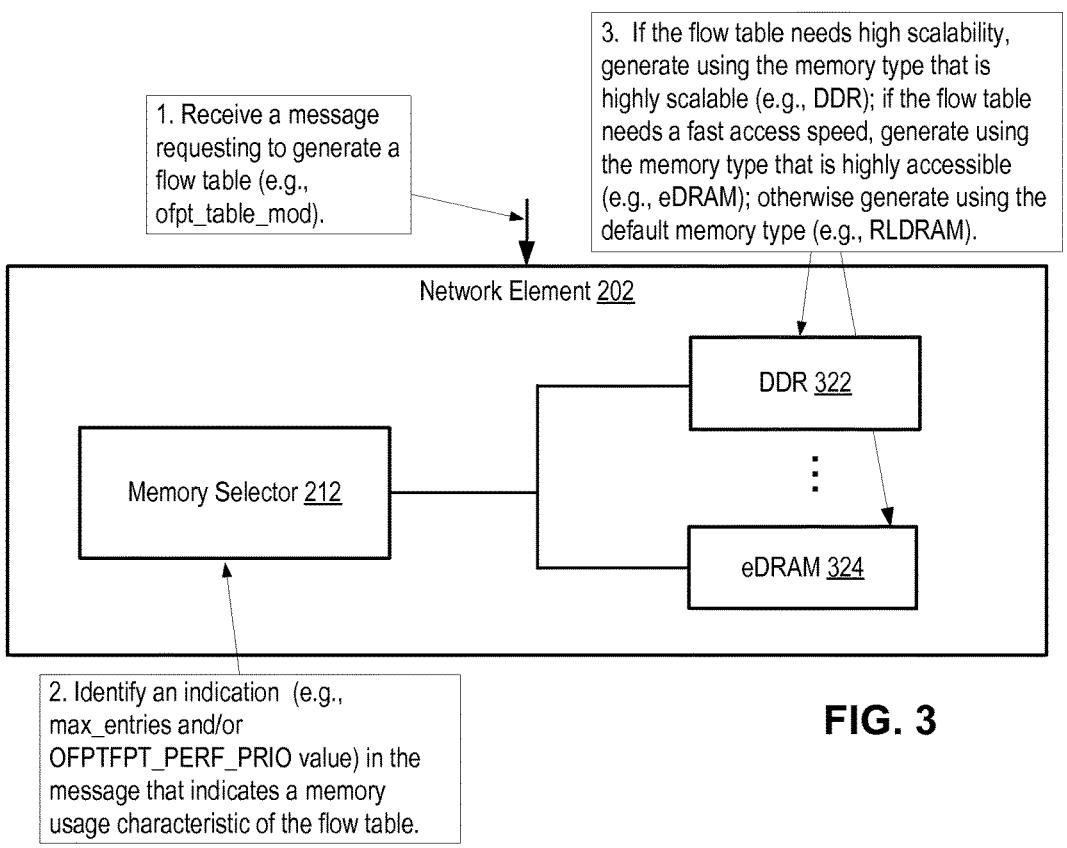
FIG. 3 illustrates operations of adaptive generation of a flow table according to a second embodiment of the invention.

The adaptive generation of forwarding tables and table entries may be utilized in a variety of network elements. FIG. 3 illustrates operations of adaptive generation of a flow table according to a second embodiment of the invention. In this embodiment, network element 202 is implemented in a special purpose network device, and it includes memory types including DDR 322, RLDRAM (not shown), and eDRAM 324. Task boxes 1 to 3 illustrate the order in which operations are performed according to one embodiment of the invention.

At task box 1, the network element 202 receives a message (e.g., from the network controller 204). The message includes a request to generate a flow table. The message may include an OFPMP_TABLE_FEATURES request when the message is in compliance with the OpenFlow standards. As defined, the OFPMP_TABLE_FEATURES request includes an array of one or more ofp_table_features structures, which is in the following format:

/* Body for ofp_multipart_request of type OFPMP_TABLE-_FEATURES./
* Body of reply to OFPMP_TABLE_FEATURES request. */
struct ofp_table_features{
  uint16_t length; /* Length is padded to 64 bits. */
  uint8_t table_id; /* Identifier of table. Lower numbered tables are consulted first. */
  int8_t command; /* One of OFPTFC_*. */
  uint32_t features; /* Bitmap of OFPTFF_* values. */
  char name[OFP_MAX_TABLE_NAME_LEN];
  uint64_t metadata_match; /* Bits of metadata table can match. */
  uint64_t metadata_write; /* Bits of metadata table can write. */
  uint32_t capabilities; /* Bitmap of OFPTC_* values. */
  uint32_t max_entries; /* Max number of entries supported. */
  /* Table Feature Property list */
  struct ofp_table_feature_prop_header properties[0]; /* List of properties */ };

The uint32_t in the ofp_table_features is an unsigned integer in the range of 0 and $2^{32}-1$ (≈4.3 billion), and it is the maximum number of entries the flow table to be generated can support. With the network controller providing the maximum number of entries of the flow table, the network element 202 can estimate the size of the flow table.

At task box 2, the network element 202 (through the memory selector 212) identifies an indication in the message that indicates a memory usage characteristic of the flow table. The indication includes the max_entries in the ofp_table_features, which is an indication of a target scalability of the flow table. Additionally or in the alternative, the indication includes a new variable in ofp_table_feature. For example, a variable OFPTFPT_PERF_PRIO may be added in the standard ofp_table_features as discussed herein above. The target performance priority is an indication of a target access speed, and the higher the target performance priority, the higher the target access speed. The OFPTFPT_PERF_PRIO is an unsigned integer in one embodiment.

At task box 3, if the flow table to be generated needs high scalability based on the indication discussed in relation to task box 2, the network element 202 (through the memory selector 212) generates the flow table using the memory type that is highly scalable (DDR in this example). If the flow table to generated needs a high access speed based on the indication, the network element 202 (through the memory selector 212) generates the flow table using the memory type that has higher access speed (eDRAM in this example). If neither is true, the default memory type (e.g., RLDRAM) may be used to generate the flow table.

The packet forwarding process in FIG. 1D may be used as an example of using different memory types. For this packet forwarding process, the subscriber table 153 is matched on Ethertype and source IP address. While the number of supported Ethernet protocol types is limited, the source IP addresses for a network element are likely large (often over millions in a typical deployment); the size of the subscriber table 153 is thus typically big. With the subscriber table 153 being large in size, the network element 202 may generate the subscriber table 153 using a memory type that is more scalable but not highly accessible (e.g., the DDR 322). In contrast, the service table 155 often includes a limited number of entries as the number of different subscriber identifier profiles and application identifier profiles is relatively low. Additionally, many services (sometimes all) utilize the service table 155 for their packet forwarding process, and thus, it is likely critical to have a higher access speed than that of other flow tables. Since the service table 155 is both relatively small in size and on a critical path (being utilized by more services and thus preferably can be accessed with a higher access speed), it may be generated using a memory type that is less scalable but highly accessible (e.g., the eDRAM 324).

It is to be noted that when the indication includes multiple variables (e.g., both max_entries and OFPTFPT_PERF_PRIO are set in the ofp_table_features) indicating multiple memory usage characteristics, and the multiple variables may not reconcile with each other—a flow table may need to be both highly accessible and scalable. In that case, a network element may have a set of rules to determine which memory usage characteristic to satisfy. The determination may be based on the availability of different memory types, and the importance of satisfying one memory usage characteristic versus another.

The memory selector 212 may have a rule engine including rules for the memory type selection. For example, a rule one may be that if max_entries≤$2^{10}-1$ and OFPTFPT_PER- F_PRIO≤3 (e.g., with 1-10 being the range of the performance priority), the flow table may be generated using the memory type with the highest access speed. The rule may be adjusted using machine learning techniques, such as multiple layers of binomial linear discriminant analysis (e.g., logistic regression), multinomial logistic regression, neural net, decision tree/forest, or support vector machine. For example, the rule one is used to generate flow tables, and access speeds of the flow table so generated are measured. If the access speed is less than expected, the rule will be updated. Instead of max_entries≤$2^{10}$−1, the rule criteria may be changed to max_entries≤$2^6$−1, so fewer flow tables may be generated using the memory type with the highest access speed, and the flow tables using that memory type may be accessed faster.

Figure 4:
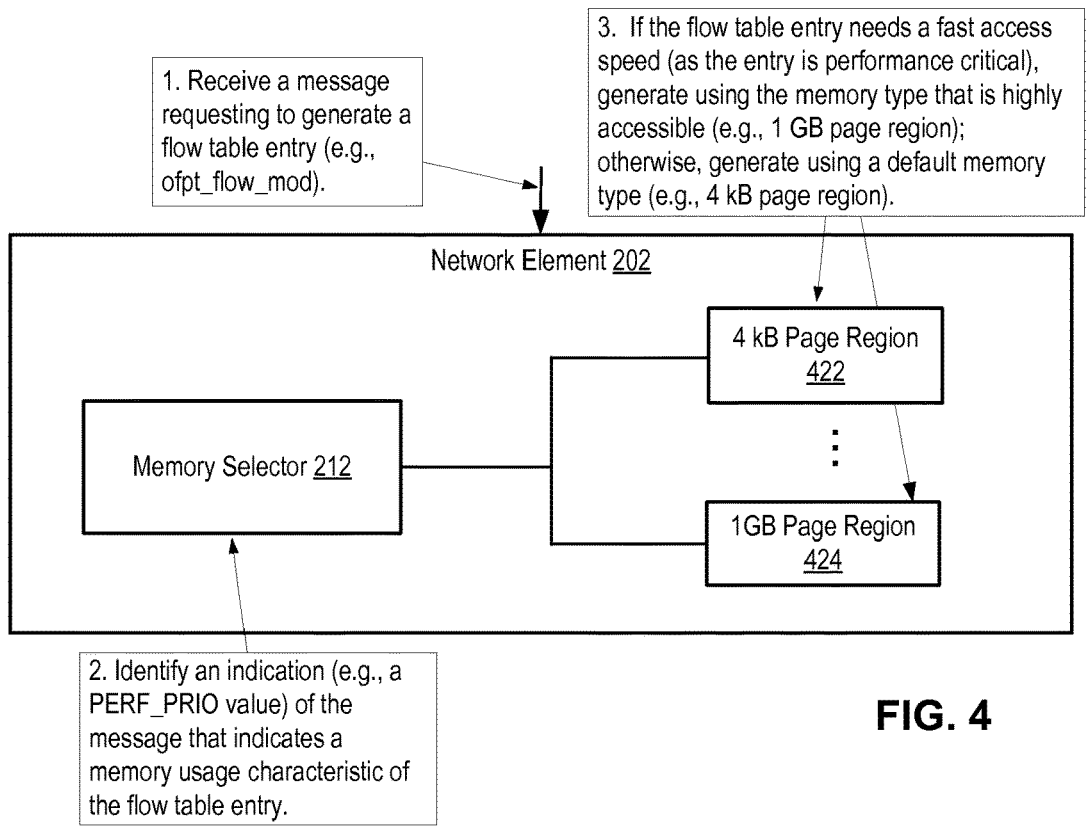
FIG. 4 illustrates operations of adaptive generation of a flow table entry according to a third embodiment of the invention.

FIG. 4 illustrates operations of adaptive generation of a flow table entry according to a third embodiment of the invention. FIG. 4 is similar to FIG. 3, and only the differences between the two figures are discussed. In this embodiment, network element 202 is implemented in a general purpose network device, and it includes memory types including 4 kB page region 422 and 1 GB page region 424.

At task box 1, the network element 202 receives a message (e.g., from the network controller 204). The message includes a request to generate a flow table entry. The message may include an OFPT_FLOW_MOD request when the message is in compliance with the OpenFlow standards. The message includes an indication of a memory usage characteristic of the flow table entry, such as the PERF_PRIO variable discussed herein above. The PERF_PRIO variable is an unsigned integer in one embodiment.

Task box 2 in FIG. 4 is similar to that of FIG. 3, but the indication to be identified is the PERF_PRIO value in FIG. 4. Then at task box 3, if the flow table entry to be generated needs to be highly accessible (as the flow table entry is performance critical) based on the indication discussed in relation to task box 2, the network element 202 (through the memory selector 212) generates the flow table entry using the memory type that is highly accessible (i.e., the 1 GB page region is highly accessible in this example). Otherwise, the network element 202 generates the flow table entry using a default memory type (i.e., the 4 kB page region in this example).

Different from FIG. 3, a page region here may satisfy both the needed memory usage characteristics. However, the selection may come at a higher cost and/or more power consumption. Thus, the selection still involves a trade-off, and the trade-off comes as a variable outside of the identified indication. In that case, the indication is not binding, and the network element 202 may consider the other factors such as the cost and/or power consumption of the memory type in selecting which memory type to use to generate the flow table entry.

A flow table may have different flow table entries in different memory types due to their respective memory usage characteristics. For example, a forwarding information base (FIB) flow table may have a set of flow table entries associated with an Internet group that needs to be accessed with a high access speed (e.g., using eDRAM), and the FIB flow table may have another set of flow table entries associated with virtual private networks (VPNs) that needs to be scalable (e.g., using DDR). The FIB flow table thus can accommodate forwarding in two different routing contexts with two different memory types.

Figure 5:
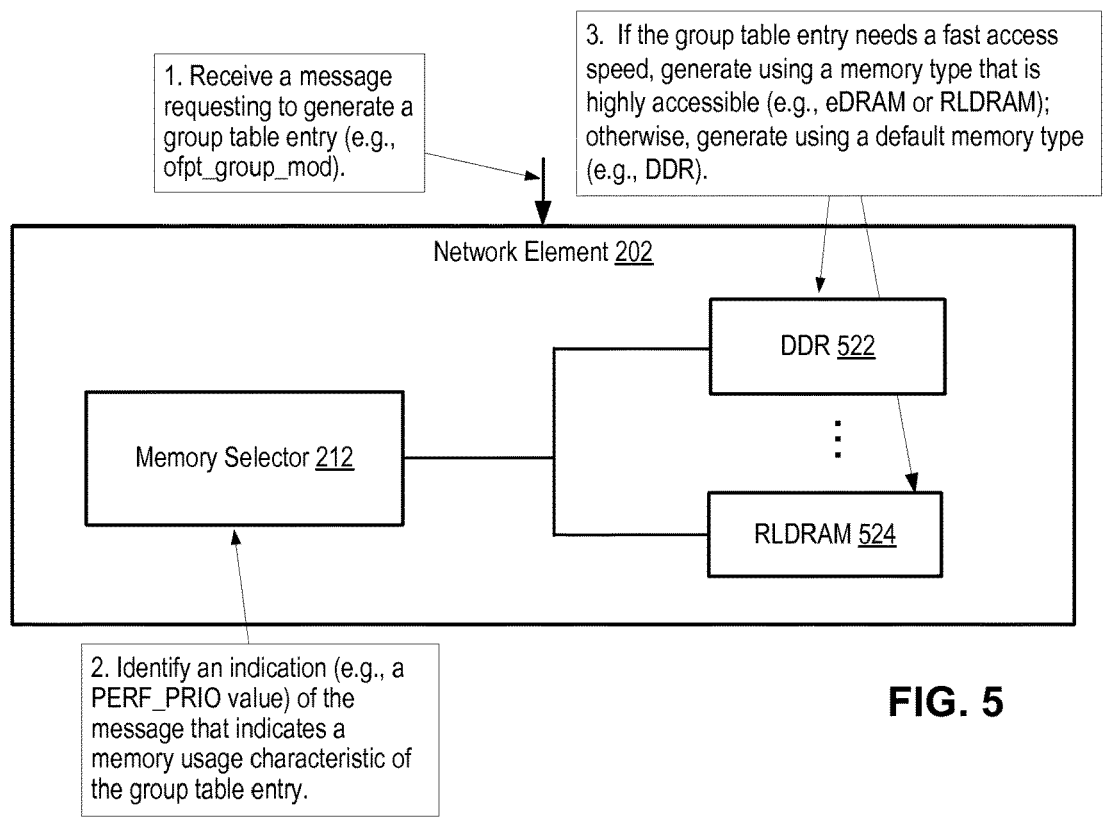
FIG. 5 illustrates operations of adaptive generation of a group table entry according to a fourth embodiment of the invention.

FIG. 5 illustrates operations of adaptive generation of a group table entry according to a fourth embodiment of the invention. FIG. 5 is similar to FIG. 3, and only the differences between the two figures are discussed.

At task box 1, the network element 202 receives a message (e.g., from the network controller 204). The message includes a request to generate a group table entry. The message may include an OFPT_GROUP_MOD request when the message is in compliance with the OpenFlow standards. The message includes an indication of a memory usage characteristic of the group table entry, such as the PERF_PRIO variable discussed herein above. The PERF_PRIO variable is an unsigned integer in one embodiment. Task box 2 in FIG. 5 is similar to that of FIG. 3, but the indication to be identified is the PERF_PRIO value in FIG. 5. At task box 3, if the group table entry needs a fast access speed, the network element 202 generates the group table entry using a memory type that is highly accessible such as an eDRAM or RLDRAM in the example. Otherwise, the network element 202 generates the group table entry using a default memory type such as DDR in the example.

It is to be noted that the illustrated embodiments are exemplary only, and flow tables, flow table entries, and group table entries (and also group tables, meter tables, meter table entries, etc.) can all be generated adaptively in a special purpose network device, a general purpose network device, and a hybrid network device. The memory usage characteristics also may include access bandwidth, power consumption, and others such as cost.

Flow Diagram

Figure 6:
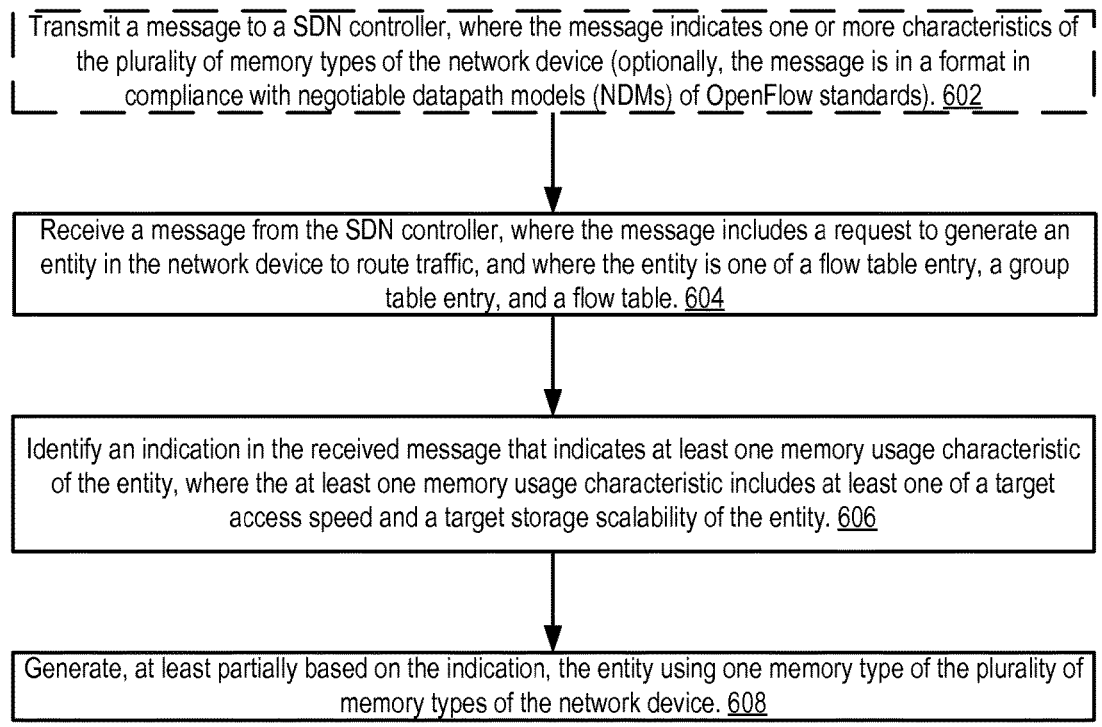
FIG. 6 is a flow diagram illustrating operations of adaptive generation of forwarding tables and forwarding table entries according to one embodiment of the invention.

FIG. 6 is a flow diagram illustrating operations of adaptive generation of forwarding tables and table entries according to one embodiment of the invention. Method 600 may be implemented in network element 202 of FIG. 2 according to one embodiment of the invention, where the network element may be implemented in a network device.

At reference 602, the network device optionally transmits a message to a SDN controller. The message indicates one or more characteristics of the plurality of memory types of the network device. In one embodiment, the message is in a format in compliance with negotiable datapath models (NDMs) of OpenFlow standards. For example, the message may use a set of parameters defined in TTP to indicate the support of memory types in the network device, including one or more parameters such as TablePerformance, TableFlow performance, and GroupPerformance.

In one embodiment, the plurality of memory types includes at least one of the following: double data rate synchronous dynamic random-access memory (DDR SDRAM), reduced-latency dynamic random-access memory (RLDRAM), and embedded dynamic random-access memory (eDRAM). In that embodiment or an alternative embodiment, the plurality of memory types includes memory regions accessible through at least one of a 4 kilobyte (kB) page table, a 2 megabyte (MB) page table, a 4 MB page table, and a 1 gigabyte (GB) page table in a translation lookaside buffer (TLB) of the network device.

At reference 604, the network device receives a message from the SDN controller. The message includes a request to generate an entity in the network device to route traffic, where the entity is one of a flow table entry, a group table entry, and a flow table. In one embodiment, the entity may be a meter table entry, a meter table, or a group table.

At reference 606, the network device identifies an indication in the received message that indicates at least one memory usage characteristic of the entity, where the at least one memory usage characteristic includes at least one of a target access speed and a target storage scalability of the entity. Additionally or in the alternative, the memory usage characteristic includes a target access bandwidth and/or a target power consumption of the entity.

At reference 608, the network device generates, at least partially based on the indication, the entity using one memory type of the plurality of memory types of the network device.

In one embodiment, the entity is a flow table. The indication in the message of reference 604 includes a value of a maximum number of entries supported in the flow table. The value of the maximum number of entries supported may be a value of max_entries in a structure of ofp_table_features of OpenFlow standards. In that embodiment or an alternative embodiment, the indication in the first message includes a value of a performance priority of the flow table.

In one embodiment, the entity is a flow table entry, and the indication in the first message includes a value of a performance priority of the flow table entry. In another embodiment, the entity is a group table entry, and the indication in the first message includes a value of a performance priority of the group table entry.

It is to be noted that while specific indications are discussed, other indications are possible in embodiments of the invention. For example, a performance priority indication may also be a set of enumerated types (e.g., "high", "low") instead of an integer. The interpretation of the indication is left to be agreed upon by the SDN controllers and the network element. Thus, fields other than (or in addition to) the max_entries in the OpenFlow standards, and parameters to be added to the existing OpenFlow standards other than (or in addition to) PERF_PRIO may be used to indicate memory usage characteristic(s) of the entity.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
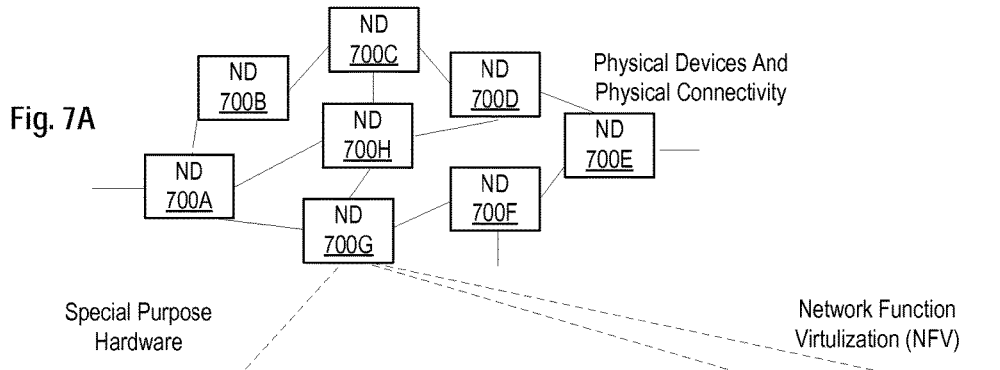
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special purpose network device 702 that uses custom application-specific integrated-circuits (ASICs) and a proprietary operating system (OS); and 2) a general purpose network device 704 that uses common off-the-shelf (COTS) processors and a standard OS.

The special purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720, including the memory selector (MS) 212 as discussed herein above, which is a software module configured on special purpose network device 702 for coordinating adaptive generation process discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the memory selector 212 may be executed by the networking hardware 710 to instantiate a memory selector instance (MSI) 721A, which perform methods discussed herein above such as method 600. MSI 721A and that part of the networking hardware 710 that executes that instance (be it hardware dedicated to that networking software instance and/or time slices of hardware temporally shared by that networking software instance with others of the networking software instance 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
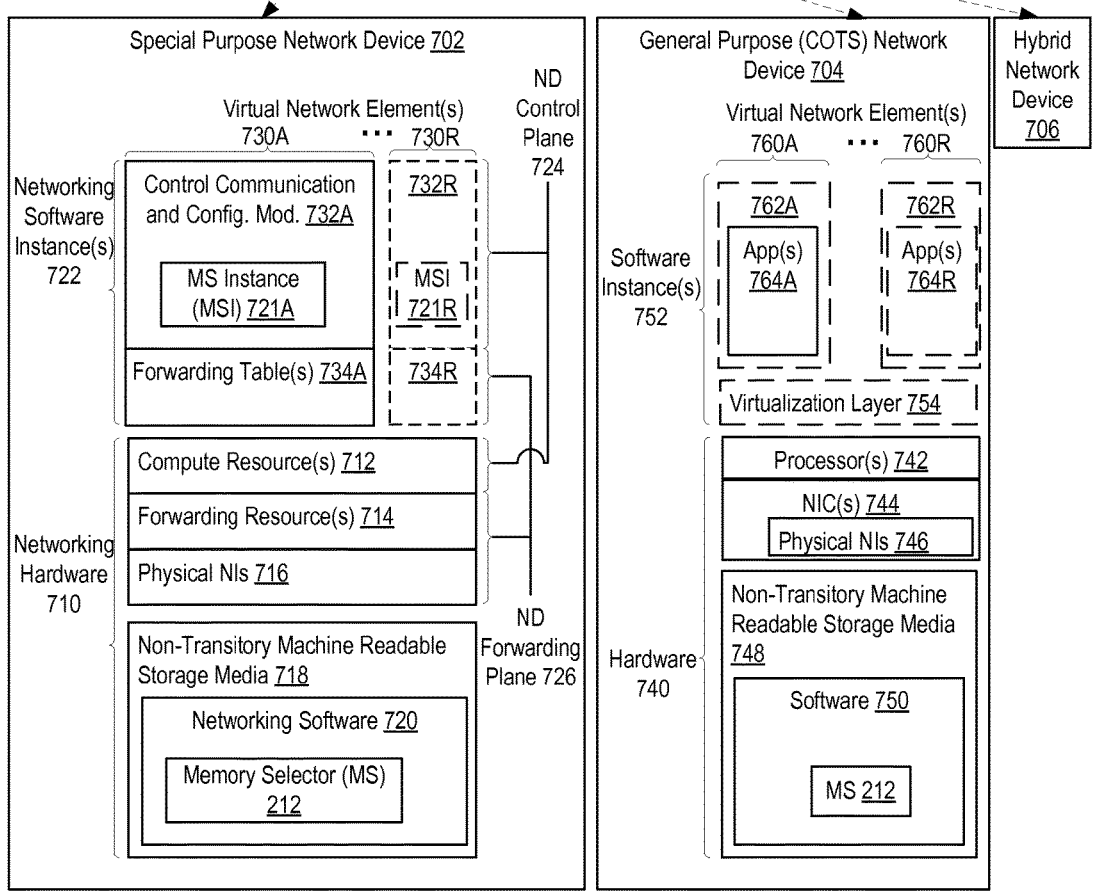
FIG. 7B illustrates an exemplary way to implement a special purpose network device according to some embodiments of the invention.
Figure 7B:
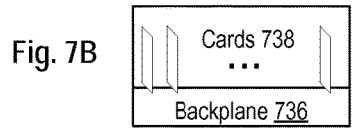

FIG. 7B illustrates an exemplary way to implement the special purpose network device 702 according to some embodiments of the invention. FIG. 7B shows a special purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750, which may also contain the memory selector 212. During operation, the processor(s) 742 execute the software 750 to instantiate one or more sets of one or more applications 764A-R. While one embodiment does not implement virtualization, alternative embodiments may use different forms of virtualization— represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 7C:
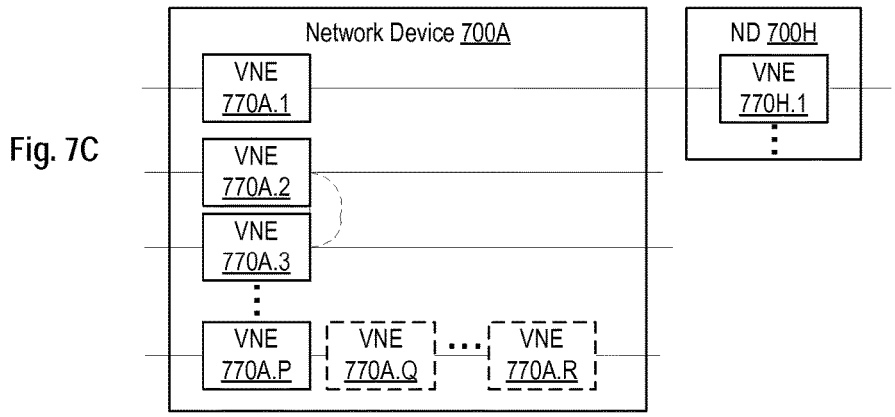
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special purpose network device 702, one or more such servers could also be run on a hypervisor executed by the compute resource(s) 712; in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
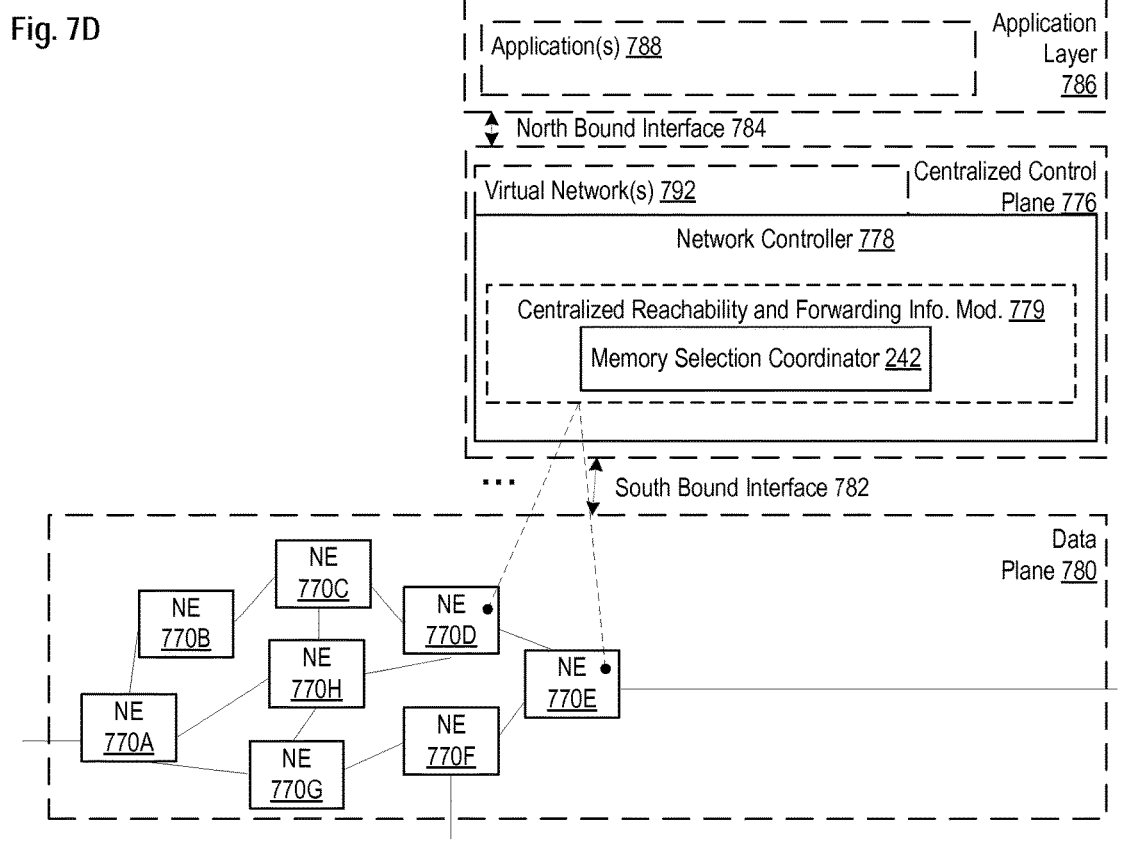
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A. Specifically, FIG. 7D illustrates network elements (NEs) 770A-H with the same connectivity as the NDs 700A-H of FIG. 7A with a centralized approach for maintaining reachability and forwarding information (also called network control), according to some embodiments of the invention.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). The centralized reachability and forwarding information module 779 contains the memory selection coordinator 242 as illustrated in, and described with reference to, FIG. 2.

The network intelligence is centralized in the centralized control plane 776 executing on electronic devices that are typically separate from the NDs. For example, where the special purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
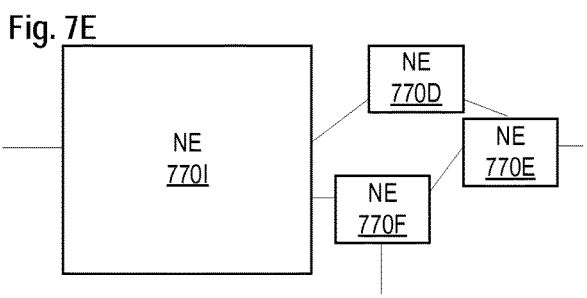
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
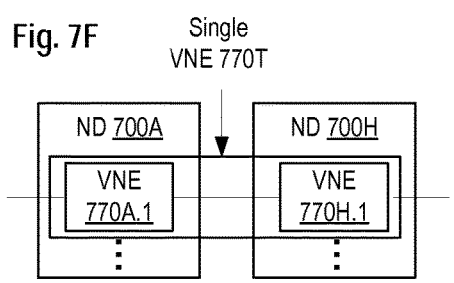
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagram FIG. 6 are described with reference to the exemplary embodiment of FIGS. 2-5 and 7A-F. However, it should be understood that the operations of flow diagrams can be performed by embodiments of the invention other than those discussed with reference to the exemplary embodiment of FIGS. 2-5 and 7A-F, and the exemplary embodiment of FIGS. 2-5 and 7A-F can perform operations different than those discussed with reference to the flow diagram of FIG. 6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device coupled to a software-defined networking (SDN) system, wherein the SDN system includes a SDN controller managing the network device, the method comprising:
    receiving a first message from the SDN controller, wherein the first message includes a request to generate an entity in the network device to route traffic, wherein the entity is one of a flow table entry, a group table entry, and a flow table, and wherein the network device transmits a second message to the SDN controller prior to receiving the first message, the second message indicating one or more characteristics of a plurality of memory types of the network device;
    identifying an indication in the first message that indicates at least one memory usage characteristic of the entity, wherein the at least one memory usage characteristic includes at least one of a target access speed and a target storage scalability of the entity; and
    generating, at least partially based on the indication, the entity using one memory type of the plurality of memory types of the network device.

2. The method of claim 1, wherein the plurality of memory types includes at least one of the following: double data rate synchronous dynamic random-access memory (DDR SDRAM), reduced-latency dynamic random-access memory (RLDRAM), and embedded dynamic random-access memory (eDRAM).

3. The method of claim 1, wherein the plurality of memory types includes memory regions accessible through at least one of a 4 kilobyte (kB) page table, a 2 megabyte (MB) page table, a 4 MB page table, and a 1 gigabyte (GB) page table in a translation lookaside buffer (TLB) of the network device.

4. The method of claim 1, wherein the entity is a flow table, and wherein the indication in the first message includes a value of a maximum number of entries supported in the flow table.

5. The method of claim 4, wherein the value of the maximum number of entries supported is a value of max_entries in a structure of ofp_table_features of OpenFlow standards.

6. The method of claim 1, wherein the entity is a flow table, and wherein the indication in the first message includes a value of a performance priority of the flow table.

7. The method of claim 1, wherein the entity is a flow table entry, and wherein the indication in the first message includes a value of a performance priority of the flow table entry.

8. The method of claim 1, wherein the entity is a group table entry, and wherein the indication in the first message includes a value of a performance priority of the group table entry.

9. The method of claim 1, wherein the second message is in a format in compliance with negotiable datapath models (NDMs) of OpenFlow standards.

10. A network device, to be coupled to a software-defined networking (SDN) system, wherein the SDN system includes a SDN controller managing the network device, the network device comprising:
    a processor and a non-transitory machine-readable storage medium that includes a plurality of memory types, the non-transitory machine-readable storage medium coupled to the processor, the non-transitory machine-readable storage medium containing operations executable by the processor, wherein the network device is operative to:
    receive a first message from the SDN controller, wherein the first message includes a request to generate an entity in the network device to route traffic, wherein the entity is one of a flow table entry, a group table entry, and a flow table, and wherein the network device transmits a second message to the SDN controller prior to receiving the first message, the second message indicating one or more characteristics of a plurality of memory types of the network device,
    identify an indication in the first message that indicates at least one memory usage characteristic of the entity, wherein the at least one memory usage characteristic includes at least one of a target access speed and a target storage scalability of the entity, and
    generate, at least partially based on the indication, the entity using one memory type of the plurality of memory types of the network device.

11. The network device of claim 10, wherein the plurality of memory types includes at least one of the following: double data rate synchronous dynamic random-access memory (DDR SDRAM), reduced-latency dynamic random-access memory (RLDRAM), and embedded dynamic random-access memory (eDRAM).

12. The network device of claim 10, wherein the plurality of memory types includes memory regions accessible through at least one of a 4 kilobyte (kB) page table, a 2 megabyte (MB) page table, a 4 MB page table, and a 1 gigabyte (GB) page table in a translation lookaside buffer (TLB) of the network device.

13. The network device of claim 10, wherein the entity is a flow table, and wherein the indication in the first message includes a value of a maximum number of entries supported in the flow table.

14. The network device of claim 10, wherein the entity is a group table entry, and wherein the indication in the first message includes a value of a performance priority of the group table entry.

15. A non-transitory machine-readable storage medium having instructions stored therein, which when executed by a processor, cause the processor to perform operations in a network device coupled to a software-defined networking (SDN) system, wherein the SDN system includes a SDN controller managing the network device, the operations comprising:
    receiving a first message from the SDN controller, wherein the first message includes a request to generate an entity in the network device to route traffic, wherein the entity is one of a flow table entry, a group table entry, and a flow table, and wherein the network device transmits a second message to the SDN controller prior to receiving the first message, the second message indicating one or more characteristics of a plurality of memory types of the network device;
    identifying an indication in the first message that indicates at least one memory usage characteristic of the entity, wherein the at least one memory usage characteristic includes at least one of a target access speed and a target storage scalability of the entity; and
    generating, at least partially based on the indication, the entity using one memory type of the plurality of memory types of the network device.

16. The non-transitory machine-readable storage medium of claim 15, wherein the entity is a flow table, and wherein the indication in the first message includes a value of a maximum number of entries supported in the flow table.

17. The non-transitory machine-readable storage medium of claim 15, wherein the entity is a flow table entry, and wherein the indication in the first message includes a value of a performance priority of the flow table entry.

18. The non-transitory machine-readable storage medium of claim 15, wherein the entity is a group table entry, and wherein the indication in the first message includes a value of a performance priority of the group table entry.

* * * * *